3,695,836
SYNTHESIS OF PURE MINERAL SPHENE IN THE FORM OF UNIFORMLY SIZED PARTICLES
Julie Chi-Sun Yang, Somerville, N.J., assignor to Johns-Manville Corporation, New York, N.Y.
No Drawing. Filed May 26, 1970, Ser. No. 40,711
Int. Cl. C01b 33/24, 33/20
U.S. Cl. 423—331
7 Claims

ABSTRACT OF THE DISCLOSURE

Method of synthesizing a pure mineral sphene in the form of uniformly sized particles adaptable for use as paint type pigments which are stable under exaggerated thermal and other aggressive conditions, comprising pre-reacting at ambient temperatures a mixture of oxides of the constituents consisting of lime, titania, and silica, and thereafter hydrothermally reacting at high temperature and pressure, within an atmosphere of substantially saturated water vapor.

CROSS-REFERENCE TO RELATED APPLICATION

This application for patent embodies and is directed to an improvement in the invention of copending commonly assigned application Ser. No. 23,006, filed Mar. 26, 1970, in the name of Harker and Pellicane for hydrothermal synthesis of sphene and the product thereof.

BACKGROUND OF THE INVENTION

The exaggerated thermal and other aggressively destructive conditions now frequently encountered in high performance aircraft and aerospace applications, etc. have taxed conventional paint and related coating pigment materials to the extent of constitutional deterioration such as inducing morphological changes with an accompanying degrading or total failure in their pigment function.

SUMMARY OF THE INVENTION

This invention comprises a method of synthesizing a very pure and stable mineral sphene product having distinctive properties and of a particle size and degree of uniformity thereof which renders it uniquely useful as a white pigment material for paints, other coatings, etc. and one which is durable and effective due to its high stability during exposure to very high temperatures and a variety of aggressive conditions. In particular, this invention overcomes disadvantages of prior means of forming sphene wherein the tendency was to produce a substantial portion of relatively large crystal particles of about 30 microns or more.

It is the primary objective of this invention to provide a practical and effective method of producing an improved mineral sphene product of high purity and of a very uniform and effective particle size which is employable as such as a white pigment for paints, coatings, etc., attributable to its uniformly apt size coupled with its good whiteness and brightness, high index of refraction, outstanding stability under diverse aggressive conditions, among many other properties which tend to its enhanced performance as a pigment.

DESCRIPTION OF THE PREFERRED EMBODIMENT

This invention basically comprises an improved method of synthesizing a substantially pure mineral sphene product in the form of uniformly sized particles from its essential oxide components consisting of lime, titania, and silica, comprising a two-phase reaction including the application of sequential temperature conditions of each below the boiling point of water at typical atmospheric pressures, and thereafter above the boiling point of water.

The two-phase reaction conditions of the synthesis of this invention comprise subjecting a water suspension of the admixture of oxide reactants to a preliminary reaction period at common ambient conditions of generally room temperature, e.g., about 25° C., but at least below the boiling level of water at common atmospheric conditions, that is preferably less than about 90° C. and most suitably normal room temperatures of approximately 20–30° C., followed by reaction at temperatures in excess of boiling and at superatmospheric steam temperatures and pressures of at least 200° C. and 211 lbs./sq. inch. Typical high temperature hydrothermal conditions, the second phase of the reaction, consist of temperatures ranging from about 225 to about 325° C. The preliminary reaction at temperatures below boiling should be of a duration of at least about one hour and preferably about two to about five hours will suffice under most conditions, and in any case for practical reasons normally need not exceed about 24 hours. The substantially high temperature reaction phase should follow thereafter for a duration of in excess of 12 hours and typically would comprise about 24 to about 98 hours. In general, excessive temperatures and pressures for example 600° C. and 10,000 p.s.i. or more tend to produce very large sphene crystals in the order of 30 microns and therefore should be avoided when a fine uniform product is desired as in keeping with the objectives of this invention.

To achieve minimum adulteration of the mineral sphene product and thus maximum whiteness and brightness and over-all pigment function, it is desired that the raw materials providing the reactive oxide sources be as pure as practical as well as of a suitable reactive form. For example, the lime should constitute a hydrate such as reagent grade $Ca(OH)_2$ generally containing about 65 to 70 percent CaO. Titanium may be provided in more pure form of $TiO_2 nH_2O$ such as a poorly crystallized anatase marketed as Titanox A–MO by the National Lead Company and having 77.7 percent $TiO_2$, or an ultra-fine and highly pure anatase formed by flame hydrolysis of titanium tetrachloride, with an average particle diameter of 0.03 micron available as Cab-O-Ti M85 from the Cabot Corporation and having 97.8 percent $TiO_2$. Preferred sources of silica comprise silicic acid, and amorphous $SiO_2 nH_2O$ such as Mallinckrodt Chemical Works Special Bulky Silicic Acid containing 87.5 percent $SiO_2$. Other apt sources of silica comprise more pure forms of diatomite.

Ingredients should be proportioned to provide substantially stoichiometric ratios of one mol CaO, one mol of $TiO_2$, one mol of $SiO_2$. These reactive materials are dispersed in a water medium proportioned to provide a rather dilute concentration, for example about one part by weight of solids to about 5 to 25 parts by weight of water, to enhance the reactions. Additionally to facilitate the reaction and in lieu of adequate agitation, or simply to expedite the reaction, it may be appropriate or desirable to interrupt the high temperature hydrothermal phase of the reaction periodically and grind together the solid reactants to expose new surfaces to the reaction medium.

Also, to achieve the advantages and objectives of the method the reaction medium must include a mineralizer accelerator which exerts a catalytic influence upon the reaction in increasing the rate of formation without modifying the product. The mineralizer comprises alkali metal water soluble anion salts such as sodium and potassium compounds or salts, and it specifically constitutes sodium fluoride and sodium chloride, sodium carbonate, sodium borate, sodium hydroxide, and potassium chloride and fluoride, etc., for the synthesis of an optimum form.

The amount of mineralizer comprises about 2 to 25% by weight of the reactants.

Preferred conditions and materials for the synthesis of an optimum form for a mineral sphene at least insofar as purity of composition and size and uniformity of particle thereof for use as white pigments are provided in detail in the following specific illustrations.

Calculated stoichiometric proportions of one mol CaO to one mol $TiO_2$ to one mol $SiO_2$ were prepared by dry mixing "Baker Analyzed" reagent grade hydrated lime containing 67.42 percent CaO, anatase a hydrated titania-Titanox A-MO, National Lead Company having 77.7 percent $TiO_2$, and amorphous hydrated silica containing 87.5 percent $TiO_2$—Special Bulky Silicic Acid, Mallinckrodt Chemical Works. Distilled water containing predissolved sodium fluoride mineralizer in amount of 10 percent by weight of the foregoing solid reactants, was added to the dry ingredients in an amount sufficient to produce a solids to liquid weight ratio of 1 to 15. This water dispersion of reactants was agitated at room temperature (25° C.) for about three hours to induce the prereaction. Thereafter, while retained in a platinum container to minimize contamination, the water dispersion of admixture of reactants was suspended in a one-gallon autoclave above one liter of distilled water and therein further reacted hydrothermally at temperatures of 238° C. and pressures of 450 p.s.i. for a term of 72 hours. Primarily because of equipment limitations rendering it impractical to effectively agitate the ingredients within the platinum container, the reaction was interrupted at the 24 hour and 48 hour periods and the ingredients ground together in a mortar to expose new surfaces among reactive material. Following a total of 72 hours of the hydrothermal reaction conditions given, the autoclaving was completed and the product derived therefrom was identified by X-ray diffraction as consisting of crystallized mineral sphene with minor traces of anatase. Product was of an excellent white and bright color characteristic exhibiting refractive indexes of 1.90 to 2.01. Microscopic examination and Coulter counter particle size distribution analysis revealed the particles of the crystalline product to be of highly uniform size with a majority of about 3 microns. Electron micrographs of a 45 degree angle shadow-casted specimen showed most of the crystals to be thin hexagonal plates about 0.5 to 1 micron thick, 6 microns in length, and 4 microns in width.

The chemical analysis of the product provided the following composition data.

| Components | Weight, percent | Mol ratio | Theoretical Weight, percent | Theoretical Mol ratio |
|---|---|---|---|---|
| $SiO_2$ | 28.0 | 1.0 | 30.6 | 1.0 |
| $TiO_2$ | 40.1 | 1.07 | 40.8 | 1.0 |
| CaO | 31.6 | 1.21 | 28.6 | 1.0 |
| Total | 99.7 | | 100.0 | |

See the following table:

| Impurities: | Weight, percent |
|---|---|
| Mg | 0.085 |
| Fe | 0.014 |
| Al | 0.0424 |
| Ag | 0.0014 |
| Total | 0.1428 |

What I claim is:

1. The method of synthesizing pure mineral sphene composed of $CaO \cdot TiO_2 \cdot SiO_2$ in the form of uniformly sized particles comprising admixing a dispersion in water, which has been essentially purified, of the oxides of calcium, titanium, and silicon in stoichiometric molar ratios of about one mol CaO:one mol $TiO_2$:one mol $SiO_2$, and including therewith about 2 to 25 percent by weight based upon the solids constituents of the dispersion of a catalytic mineralizer of at least one water soluble alkali metal compound selected from the group consisting of sodium fluoride, potassium fluoride, sodium chloride, potassium chloride, sodium carbonate, sodium borate, and sodium hydroxide, and agitating said admixture at below boiling temperatures at atmospheric pressure levels for a period of at least one hour to initiate preliminary reacting between the oxides, and thereafter further reacting between the oxides, and thereafter further reacting said oxides under temperatures above boiling comprising hydrothermal conditions within an atmosphere of substantially saturated water vapor at a temperature of at least 200 degrees C. and pressures of at least 211 p.s.i. for a period in excess of 12 hours.

2. The method of claim 1 wherein the prereaction is carried out at temperatures within the range of between approximately 20 to 90° C. for periods of between about 2 to 24 hours, and the hydrothermal reaction is carried out at temperatures between approximately 225 and 325° C. for periods of about 24 to 98 hours.

3. The method of claim 1 wherein the prereaction is carried out at temperatures in the range of approximately 20 to 30° C. for periods of about 2 to 5 hours, and the hydrothermal reaction is carried out at temperatures within the range of approximately 225 to 325° C. for periods of about 24 to 98 hours.

4. The method of claim 1 wherein the hydrothermal reaction is periodically interrupted and the solid reactants ground to expose new surfaces of unreacted material.

5. The method of claim 1 wherein the mineralizer comprises 10 percent by weight of the solids of the reaction dispersion of sodium fluoride.

6. The method of synthesizing pure mineral sphenes composed of $CaO \cdot TiO_2 \cdot SiO_2$ in the form of uniformly sized particles substantially all less than 10 microns comprising admixing a water dispersion of the oxides of the calcium, titanium, and sodium in stoichiometric mol ratios of about 1 mol CaO, 1 mol $TiO_2$, 1 mol $SiO_2$, and including therewith about 10 percent by weight based on the solid constituents of the dispersion of sodium fluoride mineralizer, agitating said admixture at a temperature of approximately 25° C. for a period of about 3 hours to initiate preliminary reaction between the oxides, and thereafter further reacting said oxides under hydrothermal conditions within an atmosphere of substantially saturated water vapor at a temperature of 238° C. and pressure of 450 p.s.i. for a period of about 72 hours.

7. A hydrothermally synthesized pure sphene product, produced by the process of claim 1, in the form of uniformly sized particles of substantially all less than 10 microns, having a white and bright color characteristic exhibiting refractive indexes of 1.90 to 2.01, said particles being essentially all crystals in the form of thin hexagonal plates of about 0.5 to 1 micron thick, 6 microns in length, and 4 microns in width, and having equivalent chemical composition of 1.0 to 1.07 moles of $TiO_2$ and 1.0 to 1.21 moles of CaO per 1.0 mole of $SiO_2$.

References Cited

UNITED STATES PATENTS 3,528,836  9/1970  Craig _____ 106—306 X

OTHER REFERENCES

Book "Phase Diagrams for Ceramists," by Ernest M. Levin et al., pp. 230, 231, 1964 ed., The American Ceramic Soc., Columbus, Ohio.

EDWARD STERN, Primary Examiner

U.S. Cl. X.R.

106—299, 306